United States Patent [19]
Griffin

[11] Patent Number: 5,742,010
[45] Date of Patent: Apr. 21, 1998

[54] HAY BALER SCALE

[76] Inventor: Thomas J. Griffin, P.O. Box 743, Oakdale, Calif. 95361

[21] Appl. No.: 703,963

[22] Filed: Aug. 28, 1996

[51] Int. Cl.$^6$ .......................... G01G 23/00; G01G 19/00; G01G 21/22
[52] U.S. Cl. .......................... 177/161; 177/162; 177/145; 177/253
[58] Field of Search .................................... 177/145, 161, 177/253, 132–135, 245, 262

[56] References Cited

U.S. PATENT DOCUMENTS

| | | | |
|---|---|---|---|
| 4,047,628 | 9/1977 | Havens | 214/152 |
| 5,024,152 | 8/1991 | Girard | 100/188 R |
| 5,316,426 | 5/1994 | Dwyer et al. | 414/24.5 |
| 5,384,436 | 1/1995 | Pritchard | 177/136 |

FOREIGN PATENT DOCUMENTS

| 1 460 587 | 1/1977 | Canada | 177/134 |
|---|---|---|---|

Primary Examiner—Michael L. Gellner
Assistant Examiner—Anb Mai
Attorney, Agent, or Firm—Jack Lo

[57] ABSTRACT

A hay baler scale is provided for automatically weighing hay bales as they emerge from a hay baler. It includes a weighing platform attached to opening of a chute of the hay baler, and a controller with a display. When a hay bale emerges from the baler, it is rotated a quarter turn by the chute and ejected onto the weighing platform. The controller is programmed to wait until the bale has stopped bouncing by ignoring the first readings, take multiple samples of the bale's weight, and show the average on the display in about 0.75 second. The controller thus ensures that a reasonably accurate weighing is performed despite the weighing platform being attached to a moving and vibrating hay baler. In a second embodiment, the weighing platform is attached to the top of a chute, so that the bales slide onto the platform without turning. In a third embodiment, a pair of tension transducers each have one end attached to the upper edge of a bale output opening of the baler, and another end connected to the top of a chain supporting a chute in a horizontal position, so that the bales slide onto the chute without turning.

14 Claims, 6 Drawing Sheets

5,742,010

HAY BALER SCALE

BACKGROUND OF THE INVENTION

1. Field Of The Invention

This invention relates generally to weighing devices, specifically to a hay baler scale.

2. Prior Art

A hay baler is a mobile machine that picks up loose hay from the ground, and compacts it into rectangular blocks or bales with a bale forming mechanism. The bales are ejected from the output opening of the bale forming mechanism onto a narrow chute offset to one side of the bale path. The chute includes a ramp that tips the bales over, so that they make a quarter turn and fall to the ground to rest on their side. Another type of chute is wider and has a proximal end hingeably connected to the lower edge of bale output opening. It is suspended in a horizontal position by a pair of chains connecting its sides to the top of the bale output opening. It is centered along the bale path, so that the bales slide onto it without turning over.

A hay baler is typically adjustable for producing bales of different sizes, density, and weight. It is important to know the weight of the bales produced, so that they do not contain too much or too little hay. However, typical hay balers include no built-in provision for weighing the bales. Therefore, a user must make a bale, weigh it on a separate hay bale scale in a stable enviroment, adjust the baler, make another bale, weigh it, readjust the baler, and so on in a trial-and-error process.

U.S. Pat. No. 5,384,436 to Pritchard (1995) discloses a weighing device that weighs the bales as they emerge from the bale forming mechanism of a hay baler. It includes two support beams extending rearwards from the output end of the baler, two load cells attached to the back of the baler, and a third load cell attached to one of the beams. A chute is suspended from the load cells, so that the chute doubles as a weighing platform for weighing the bales as they emerge. The load cells are connected to a digital indicator that takes multiple weight samples of a bale and displays an average result. However, the Pritchard device is difficult to install: it requires removing the chute, bolting or welding the pair of support beams to the baler, mounting the load cells, and attaching the chute to the load cells. When a bale drops onto the chute, it will bounce about for a short moment. Therefore, the initial few samples taken by the indicator may be far off the actual weight, which will cause the average to become skewed and produce an inaccurate result.

OBJECTS OF THE INVENTION

Accordingly an object of the present invention is to provide a hay baler scale that automatically weighs the bales as they emerge from a baler.

Another object of the present invention is to provide a hay baler scale that weighs the bales accurately on a moving hay baler.

Still another object of the present invention is to provide a hay baler scale that is easily retrofitted to existing hay balers.

Further objects of the present invention will become apparent from a consideration of the drawings and ensuing description.

SUMMARY OF THE INVENTION

A hay baler scale includes a weighing platform connected to a controller. The weighing platform includes a pair of U-shaped brackets extending across and below a horizontal opening of the baler's output chute. A pair of elongated weight transducers are positioned along the bottom portion of the brackets, and a plate is positioned on top of the weight transducers. When a bale emerges from the bale forming mechanism, it is tipped by the chute onto the weighing platform. The controller is programmed to take multiple samples of the bale's weight and display the average.

In a second embodiment of the invention, a longitudinal bar is mounted in the opening of the chute, and a transverse bar is mounted between the longitudinal bar and the side of the chute. The weight transducers are mounted transversely between the top of the longitudinal bar and the top of the chute, and a plate is mounted on top of the transducers. The chute is lowered enough so that the plate is slightly below the bottom of the bale output opening. When a bale is formed, it is ejected directly onto the plate for weighing, and is pushed off by the following bale.

In a third embodiment of the invention, a conventional chute has a proximal end hingeably attached to the lower edge of the bale output opening. A pair of tension transducers each have one end hingeably attached to the upper edge of the bale output opening, and another end connected to a corresponding side of the chute by a chain. When a bale is formed, it is ejected directly onto the chute for weighing, and is pushed off by the following bale.

DRAWING REFERENCE NUMERALS

| | |
|---|---|
| 10. Weighing Platform | 11. U-Shaped Brackets |
| 12. Skids | 13. Weight Transducers |
| 14. Resilient Bushings | 15. Bolts |
| 16. Plate | 17. L-Shaped Brackets |
| 18. L-Shaped Brackets | 19. Controller |
| 20. Display | 21. Microprocessor |
| 22. Hay Baler | 23. Bale Output Opening |
| 24. Chute | 25. Support Member |
| 26. Ramp | 27. Hay Bale |
| 28. Opening | 30-42. Flowchart Blocks |
| 50. Longitudinal Supporting Bar | 51. Transverse Supporting Bar |
| 52. Tension Transducers | 53. Chains |
| 54. Bale Output Opening | 55. Chute |
| 56. Hay Baler | |

Figure 1:
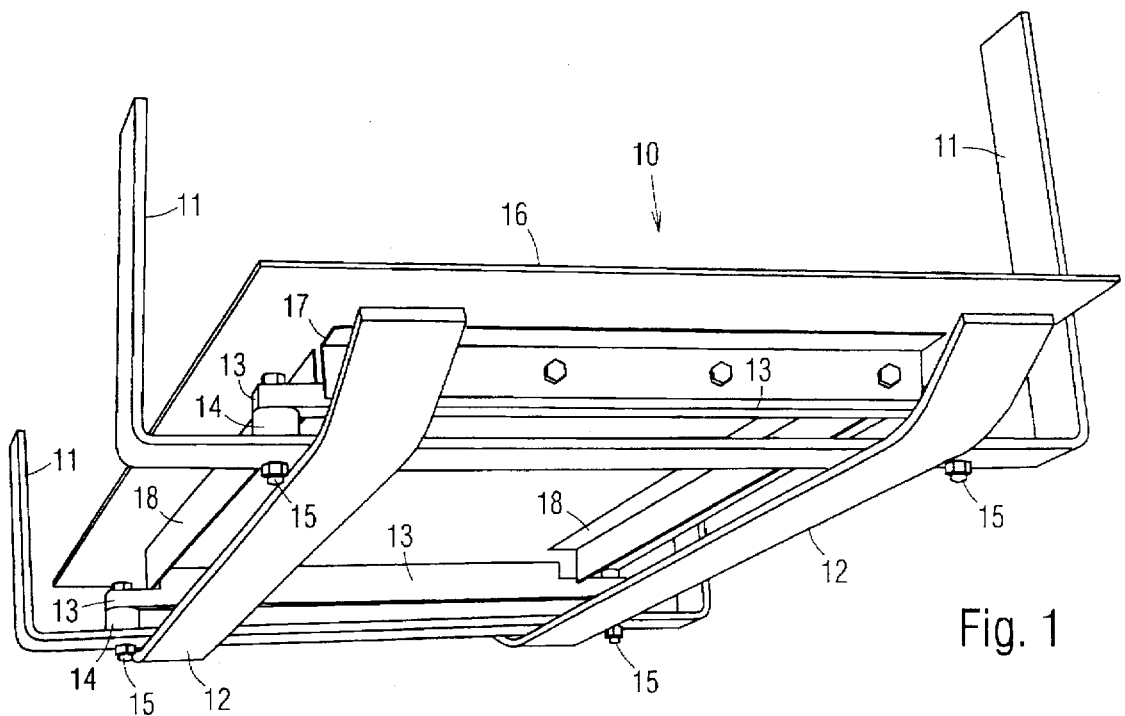
FIG. 1 is a bottom perspective view of a hay baler scale in accordance with a first embodiment of the invention.

Description—FIG. 1

In accordance with a first embodiment of the invention, a hay baler scale includes a weighing platform 10, which is shown in a bottom perspective view in FIG. 1. Weighing platform 10 includes a pair of supporting members or U-shaped brackets 11 connected in spaced relation by a pair of longitudinal protective skids 12. A pair of elongated weight transducers 13 are supported above and parallel to the horizontal portions of U-shaped brackets 11 by resilient bushings 14 and bolts 15 attached to the ends of weight transducers 13, which are conventional bridge-type load cells. A horizontal plate 16 positioned above weight transducers 13 are secured thereto by a pair of L-shaped brackets 17 (one shown). Another pair of L-shaped brackets 18 are arranged longitudinally under plate 16 to provide structural reinforcement.

Figure 2:
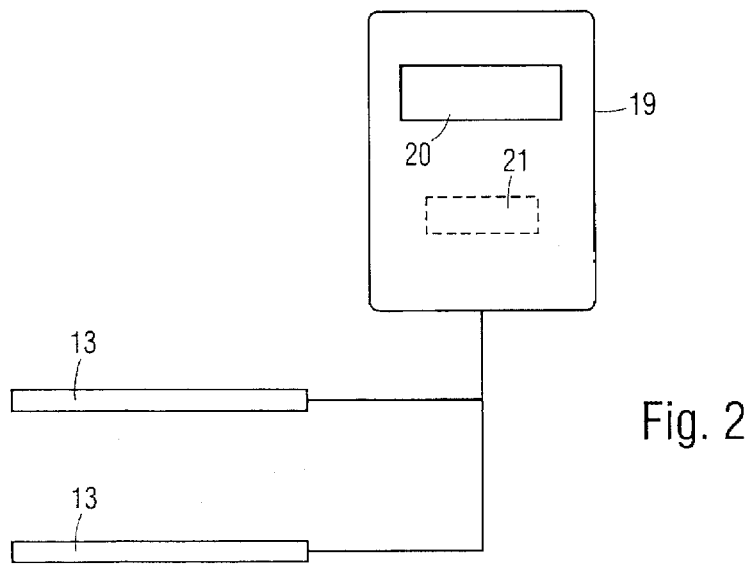
FIG. 2 is a schematic diagram of the hay baler scale.

Description—FIG. 2

As shown in the schematic diagram in FIG. 2, the electrical outputs of weight transducers 13 are connected in parallel by cables to a controller 19 with a display 20. Controller 19 is a conventional weighing controller, such as the Tara Systems model "TR-1-NK." The original microprocessor of controller 19 is replaced with a microprocessor 21 with customized programming, which will be described in conjunction with FIG. 7. Controller 19 may be mounted in any convenient location that is easily within reach of an operator.

Figure 3:
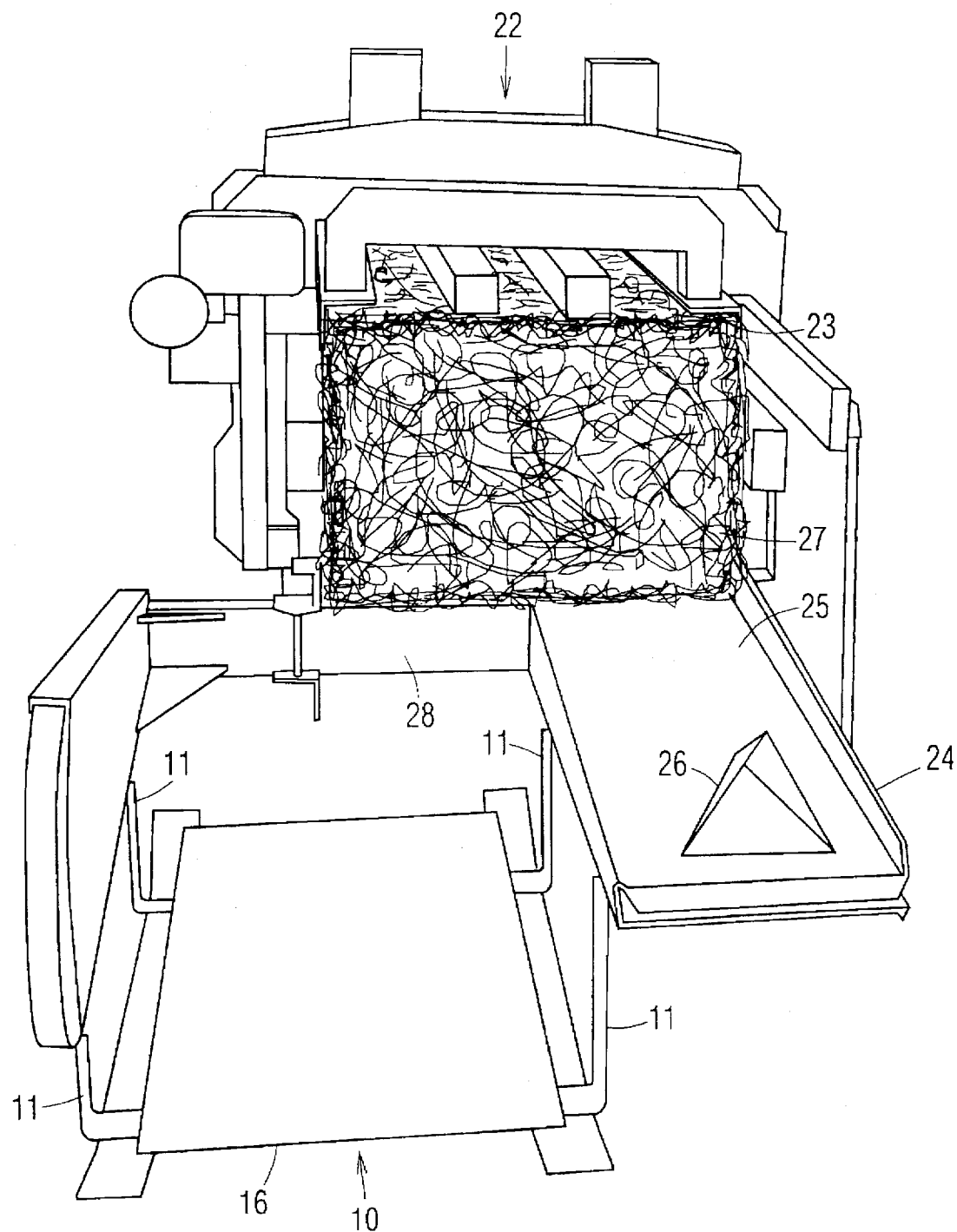
FIG. 3 is a rear perspective view of the hay baler scale mounted on a hay baler.
Figure 4:
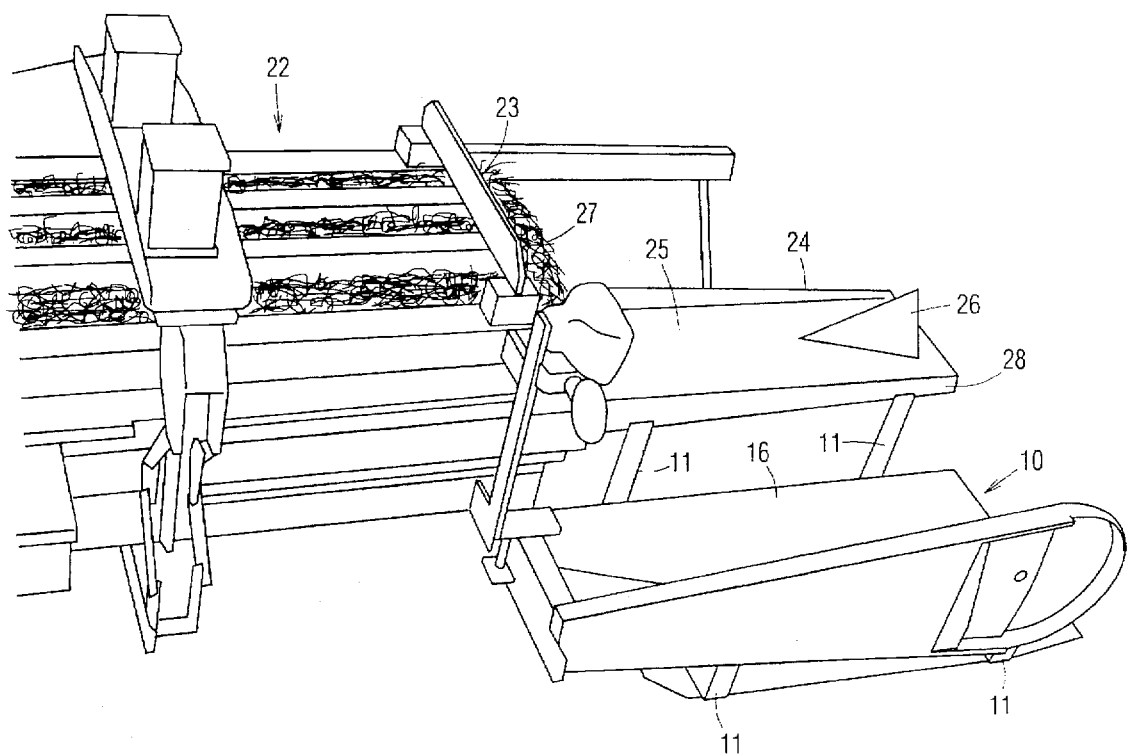
FIG. 4 is a side perspective view of the hay baler scale mounted on the hay baler.

Description—FIGS. 3 and 4

A bale output opening 23 at the rear of a conventional hay baler 22 is shown in FIGS. 3 and 4; the front portion of the hay baler is not shown. A conventional, horizontal U-shaped chute 24 is attached to the bottom edge of output opening 23. Chute 24 includes a narrow longitudinal support member 25 offset to one side of the bale path. A ramp 26 is positioned at the rear end of support member 25 for tipping the emerging hay bale 27 through an opening 28, so that rectangular hay bale 27 is rotated 90 degrees as it falls through.

Weighing platform 10 is easily mounted under opening 28 by welding, bolting, or otherwise attaching the upper ends of U-shaped brackets 11 to the lower side edges thereof. U-shaped brackets 11 are sized so that plate 16 is spaced below the top of opening 28 by a distance less than the width of hay bales 27. When a hay bale 27 is ejected from bale output opening 23, it is tipped through opening 28 by ramp 26, so that it will rest on plate 16 on its narrower side, and its wider side will extend through opening 28. When the next hay bale is ejected from bale output opening 23, it will push the previous hay bale off weighing platform 10 before tipping onto plate 16. Therefore, each emerging hay bale ejects the previous hay bale from weighing platform 10, so that only one hay bale is supported thereon at any moment.

Figure 5:
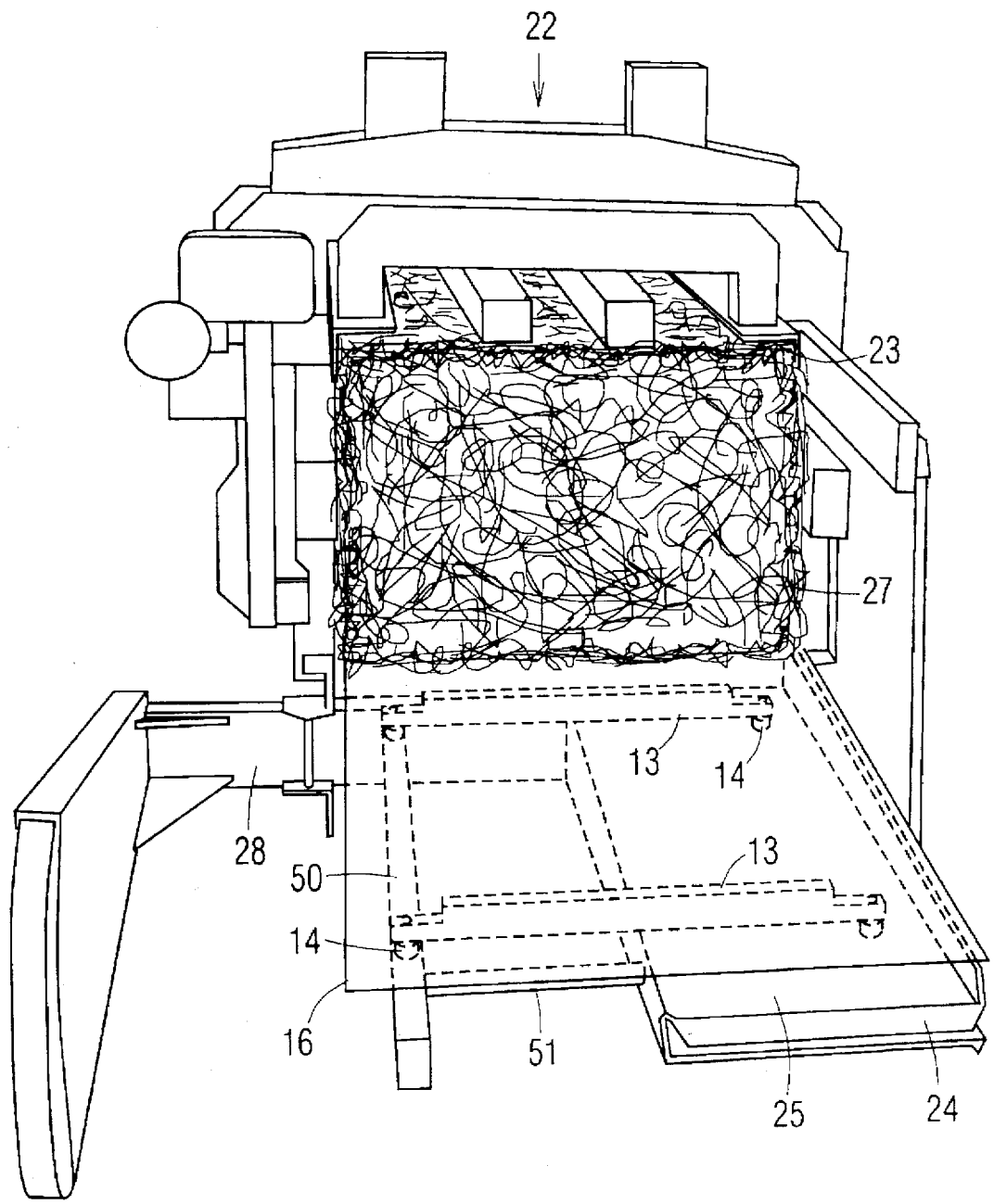
FIG. 5 is a rear perspective of a hay baler scale in accordance with a second embodiment of the invention.

Description—FIG. 5

In accordance with a second embodiment of the invention shown in FIG. 5, a hay baler scale includes a longitudinal supporting bar 50 attached to the forward end of opening 28 of conventional chute 24. A transverse supporting bar 51 is attached between supporting bar 50 and the side of support member 25. Ramp 26 (FIG. 3) is removed from chute 24. Weight transducers 13 are attached transversely across supporting bar 50 and support member 25 by bushings 14 attached to their ends. Plate 16 is attached on top of weight transducers 13, so that it is positioned directly in the path of bale 27. Conventional chute 24, which is easily adjustable in height, is lowered about 5 cm so that plate 16 is positioned slightly below the bottom edge of bale output opening 23. When bale 27 is ejected from output opening 23, it is slid directly onto plate 16 for weighing, and then it is pushed off by the following bale. Weight transducers 13 are connected to controller 19 as shown in FIG. 2.

Figure 6:
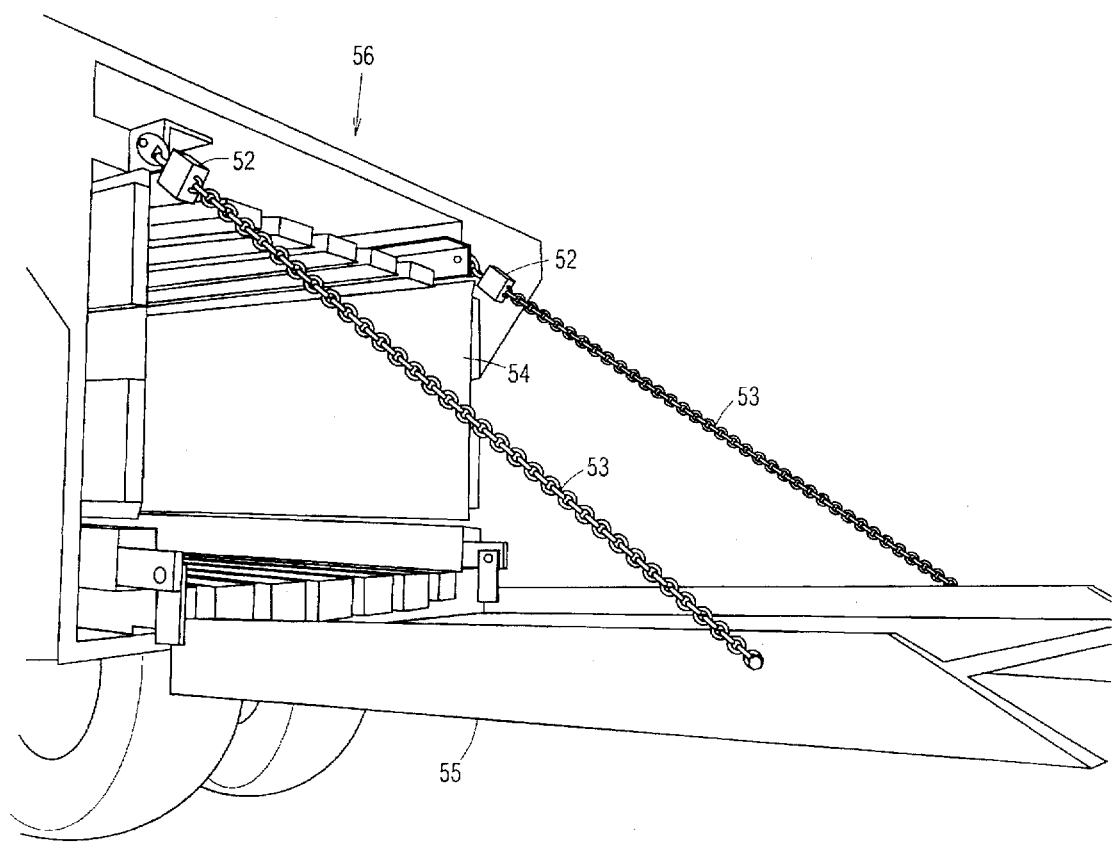
FIG. 6 is a side perspective view of a hay baler scale in accordance with a third embodiment of the invention.

Description—FIG. 6

In accordance with a third embodiment of the invention shown in FIG. 6, a hay baler scale includes a pair of tension transducers 52 each with one end hingeably attached to the top edge of a bale output opening 54 of a hay baler 56. A pair of chains 53 connect the other ends of tension transducers 52 to the sides of a conventional chute 55, which is hingeably attached to the lower edge of bale output opening 54. The tension sensed by tension transducers 52 is a measure of the weight on chute 54. Tension transducers 52 are connected to controller 19 (FIG. 2) in the same manner as weight transducers 13 (FIG. 2). When a bale (not shown) is ejected from output opening 54, it is slid directly onto chute 55 for weighing, and then it is pushed off by the following bale.

Figure 7:
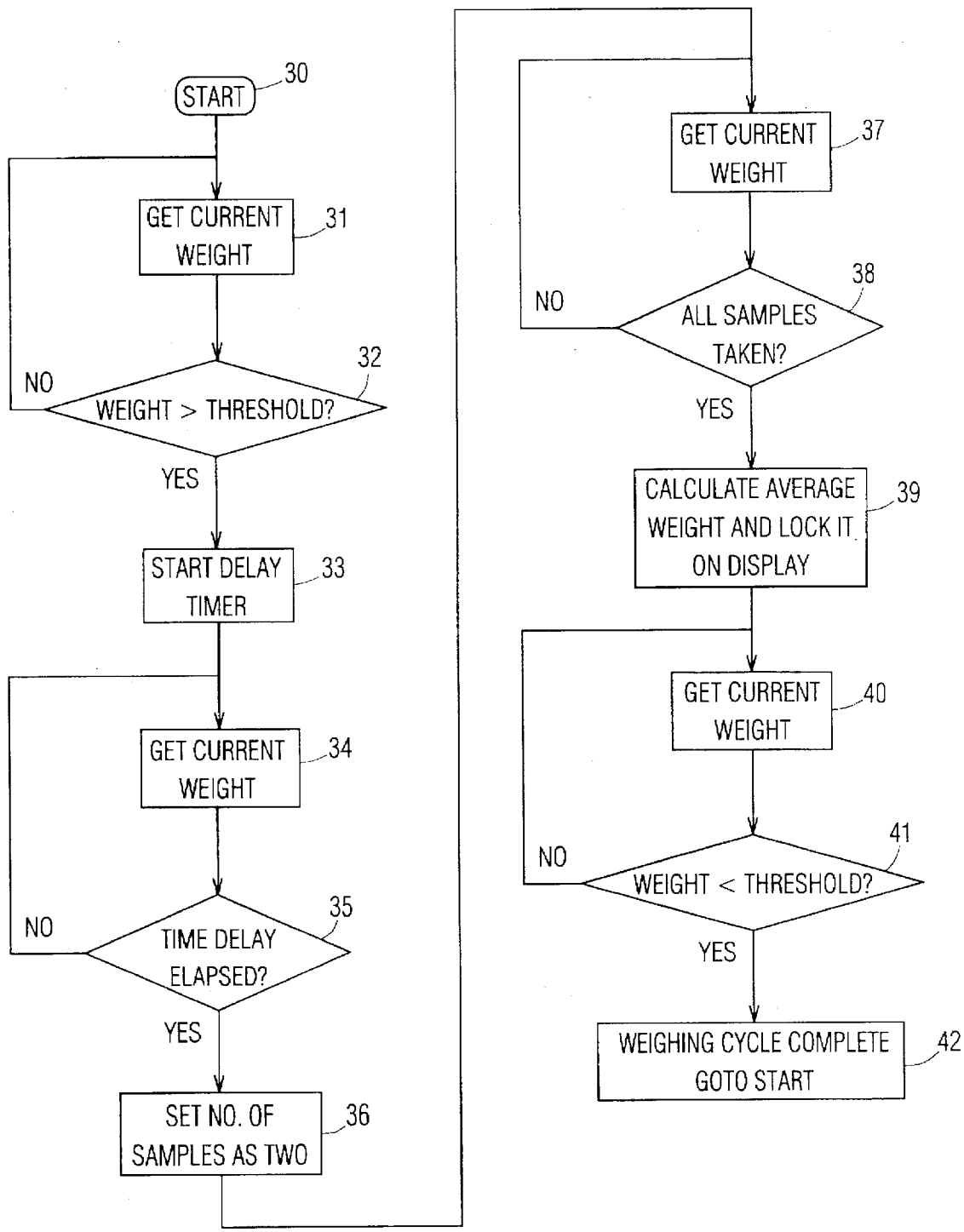
FIG. 7 is a flowchart of the hay baler scale control program.

Description—FIG. 7

Commercially available weighing controllers are designed for weighing objects in a stable environment. Therefore, using such a controller for the present hay baler scale, which is attached to a moving and vibrating hay baler, will produce inaccurate results. Therefore, microprocessor 21 (FIG. 2) is specifically programmed for weighing bales in such an unstable environment.

A flowchart illustrating the programming of the microprocessor is shown in FIG. 7. After the start at block 30, the weight on plate 16 or chute 55 (FIGS. 1, 5, and 6) is checked at block 31. If the weight is below a predetermined threshold at block 32, such as the minimum expected weight of a hay bale, the process returns to block 31. If the weight is above the threshold, an adjustable delay timer is started at block 33. The weight is checked again at block 34. The end of the time delay is monitored at block 35. If the time delay has not elapsed, the process returns to block 34. A hay bale will bounce severely momentarily when it strikes plate 16 (FIG. 1), so the time delay ensures that the hay bale has stopped bouncing before its weight is registered. After the time delayed has elapsed, the number of samples that will be taken is set as two at block 36, i.e., two samples will be taken. The weight is recorded at block 37. If the predetermined number of samples have not been taken at block 38, the process returns to block 37 to take another sample. After all the samples are taken, they are averaged and latched onto display 20 (FIG. 2) at block 39. Averaging multiple samples ensures that a reasonably accurate weighing is performed despite the unstable and vibrating environment. The weight is checked again at block 40. If the weight is above a predetermined threshold at block 41, the same hay bale must still be present, so the process returns to block 40. If the weight is below the threshold, the hay bale must have been ejected, so that the weighing cycle is completed at block 42, and the process returns to start at block 30 to wait for the next hay bale. The programming includes conventional steps (not shown) for zeroing the display, i.e., ignoring the weight of plate 16 (FIGS. 1 and 5) and chute 55 (FIG. 6).

Summary, Substitutes, And Scope

Accordingly, I have provided a hay baler scale that automatically weighs the bales as they emerge from a hay baler. It accurately weighs the bales on a moving hay baler despite the unstable and vibrating environment. It is easily retrofitted to existing hay balers. It uses only two transducers, and a modified commercially available weighing controller, so that it is economical to manufacture.

Although the above descriptions are specific, they should not be considered as limitations on the scope of the invention, but only as examples of the embodiments. Many substitutes and variations are possible within the teachings of the invention. For example, instead of U-shaped brackets, the weight transducers can be suspended below the chute's opening by other types of supporting members, such as straight bars connecting the ends of the transducers to the edges of the opening. The weight transducers can be mounted to the plate directly without the L-shaped brackets. Other types of weight transducers can be used. More than two weight transducers may be used, e.g., four weight transducers may be used, with one at each corner of the plate; or one centrally positioned weight transducer may be used. The plate can be replaced with a wire mesh, longitudinal parallel bars, etc. The weight threshold, the delay timer, and the number of samples can all be user adjustable via a controller with suitable input controls.

For the second embodiment, other types of structures may be attached in the opening of the chute to support the weight transducers, or the narrow chute may be replaced with a wider chute that can support the transducers without the use of additional supporting structure.

For the third embodiment, the chute may be supported by one chain and one tension transducer on just one side for weighing relatively light bales, e.g., those less than about 1 metric ton. Alternatively, one end of a single tension transducer may be attached to the middle of the top edge of the output opening, and the other end attached to the middle of a horizontal bar, the ends of the which are connected to the sides of the chute by a pair of chains. Therefore, the scope of the invention should be determined by the appended claims and their legal equivalents, not by the examples given.

I claim:

1. A hay baler scale for a hay baler with a bale output opening and a chute attached thereto, said chute including a horizontal opening having longitudinal side edges, said chute for rotating a hay bale emerging from said bale output opening 90 degrees and ejecting said hay bale through said horizontal opening, comprising:

weight transducer means;

supporting means having a lower end attached to said weight transducer means and an upper end adapted to be attached to said chute for supporting said weight transducer means under said horizontal opening of said chute; and plate means supported on said weight transducer means, so that when said hay bale is ejected by said chute through said horizontal opening and onto said plate means, a weight of said hay bale is sensed by said weight transducer means.

2. The hay baler scale of claim 1 wherein said weight transducer means comprise a pair of elongated load cells positioned in spaced relation under said plate means.

3. The hay baler scale of claim 1 wherein said supporting means comprises a pair of spaced apart U-shaped brackets each having upper ends adapted to be attached to respective side edges of said horizontal opening of said chute, said weight transducer means being supported on a horizontal portion of one of said U-shaped brackets.

4. The hay baler scale of claim 3, further including a pair of longitudinal skids connecting said horizontal portions of said U-shaped brackets.

5. The hay baler scale of claim 1 wherein said plate means is adapted to be supported under said horizontal opening of said chute and below a top surface thereof by a distance less than a width of said bale output opening, so that when said hay bale is rotated by said chute 90 degrees and ejected onto said plate means, said hay bale is supported on said plate means so that said hay bale extends upwardly through said opening, so that said hay bale is pushed off said plate means by another hay bale emerging from said bale output opening.

6. The hay baler scale of claim 1, further including a controller with a display, said controller being connected to said weight transducer means for displaying the weight of said hay bale.

7. The hay baler scale of claim 6, wherein said controller comprises:

weight checking means for checking the weight on said plate means;

threshold exceeded determining means for determining if a predetermined weight threshold is exceeded, so as to determine if said hay bale has dropped onto said plate means;

time delay means responsive to said threshold exceeded determining means for initiating a predetermined time delay, so as to wait until after said hay bale has stopped bouncing from the drop;

weight sampling means for taking a plurality of weight samples of said hay bale after said time delay has elapsed;

averaging means for averaging said weight samples; and displaying means for displaying the averaged weight on said display.

8. The hay baler scale of claim 7, further including threshold not exceeded determining means for determining if said weight threshold is not exceeded after displaying the averaged weight, so as to determine when said hay bale has been pushed off said plate means by another hay bale emerging from said bale output opening of said hay baler.

9. A hay baler scale for a hay baler with a bale output opening and a chute attached thereto, said chute including a horizontal opening having longitudinal side edges, said chute for rotating a hay bale emerging from said bale output opening 90 degrees and ejecting said hay bale through said horizontal opening, comprising:

a pair of U-shaped brackets each adapted to be connected between said side edges of said chute, said U-shaped brackets being spaced from each other longitudinally along said opening, each of said U-shaped brackets having upper ends adapted to be attached to respective side edges of said opening;

a pair of weight transducers each supported on a horizontal portion of one of said U-shaped brackets;

a plate supported on said weight transducers, so that when said hay bale is ejected by said chute through said horizontal opening and onto said plate, a weight of said hay bale is sensed by said weight transducers.

10. The hay baler scale of claim 9, further including a pair of longitudinal skids connecting said horizontal portions of said U-shaped brackets.

11. The hay baler scale of claim 9 wherein said plate is adapted to be supported under said opening of said chute and below a top surface thereof by a distance less than a width of said bale output opening, so that when said hay bale is rotated by said chute 90 degrees and ejected onto said plate, said hay bale is supported on said plate so that said hay bale extends upwardly through said opening, so that said hay bale is pushed off said plate by another hay bale emerging from said bale output opening of said hay baler.

12. The hay baler scale of claim 9, further including a controller with a display, said controller being connected to said weight transducers for displaying the weight of said hay bale.

13. The hay baler scale of claim 12, wherein said controller comprises: weight checking means for checking the weight on said plate;

threshold exceeded determining means for determining if a predetermined weight threshold is exceeded, so as to determine if said hay bale has dropped onto said plate;

time delay means responsive to said threshold exceeded determining means for initiating a predetermined time delay, so as to wait until after said hay bale has stopped bouncing from the drop;

weight sampling means for taking a plurality of weight samples of said hay bale after said time delay has elapsed;

averaging means for averaging said weight samples; and displaying means for displaying the averaged weight on said display.

14. The hay baler scale of claim 13, further including threshold not exceeded determining means for determining if said weight threshold is not exceeded after displaying the average weight, so as to determine when said hay bale has been pushed off said plate by another hay bale emerging from said bale output opening of said hay baler.

* * * * *